Jan. 26, 1971  W. E. PETERSON  3,558,181
COLLAPSIBLE TENT TRAILER
Filed June 19, 1968  6 Sheets-Sheet 3
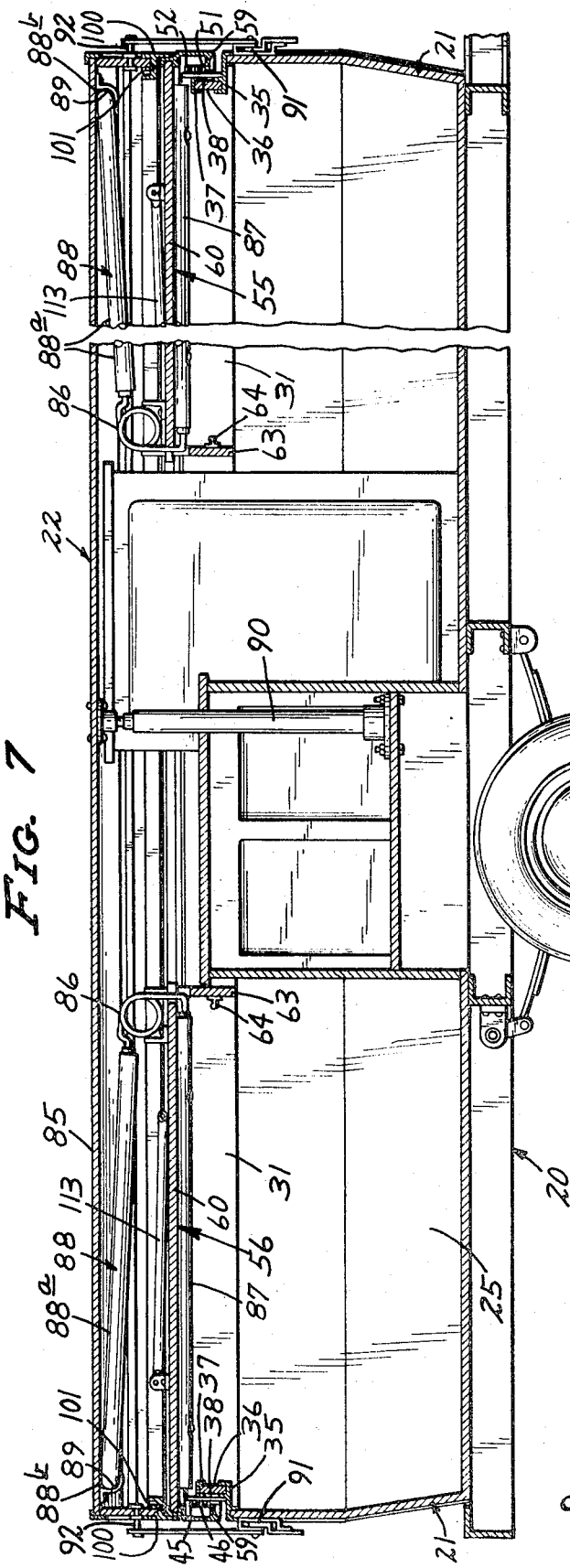
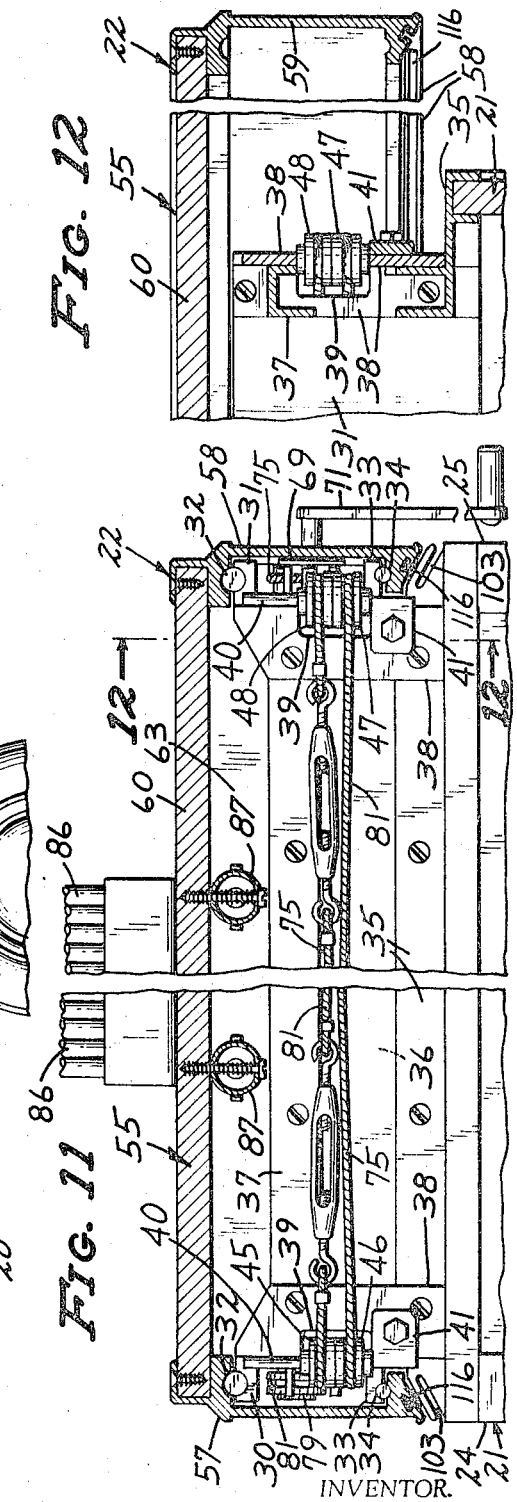
INVENTOR.
WILBUR E. PETERSON
BY
Merchant & Gould
ATTORNEYS

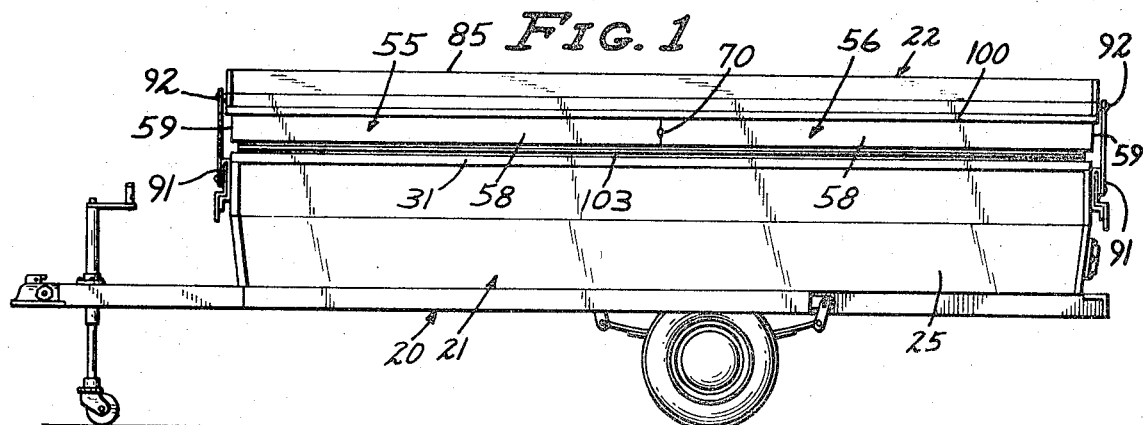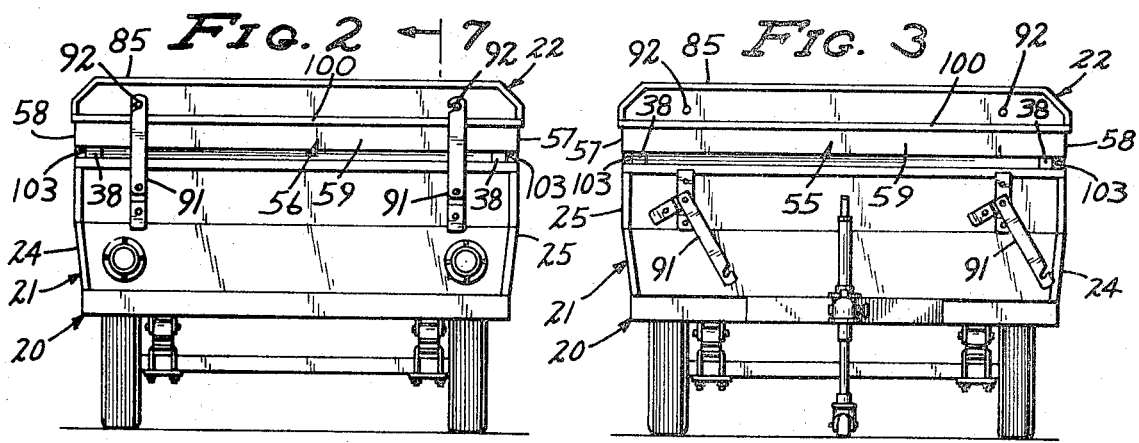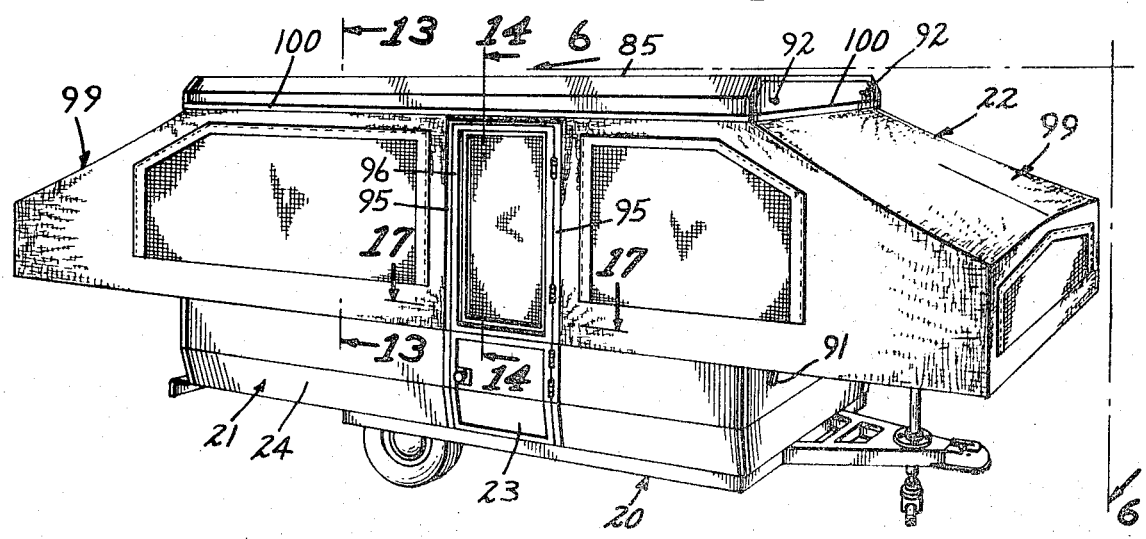

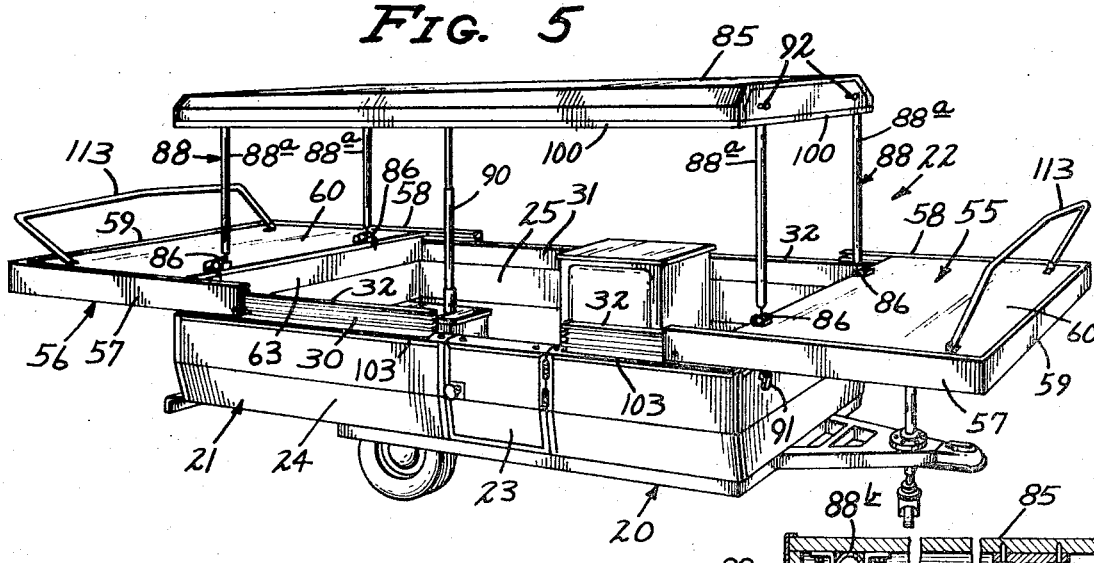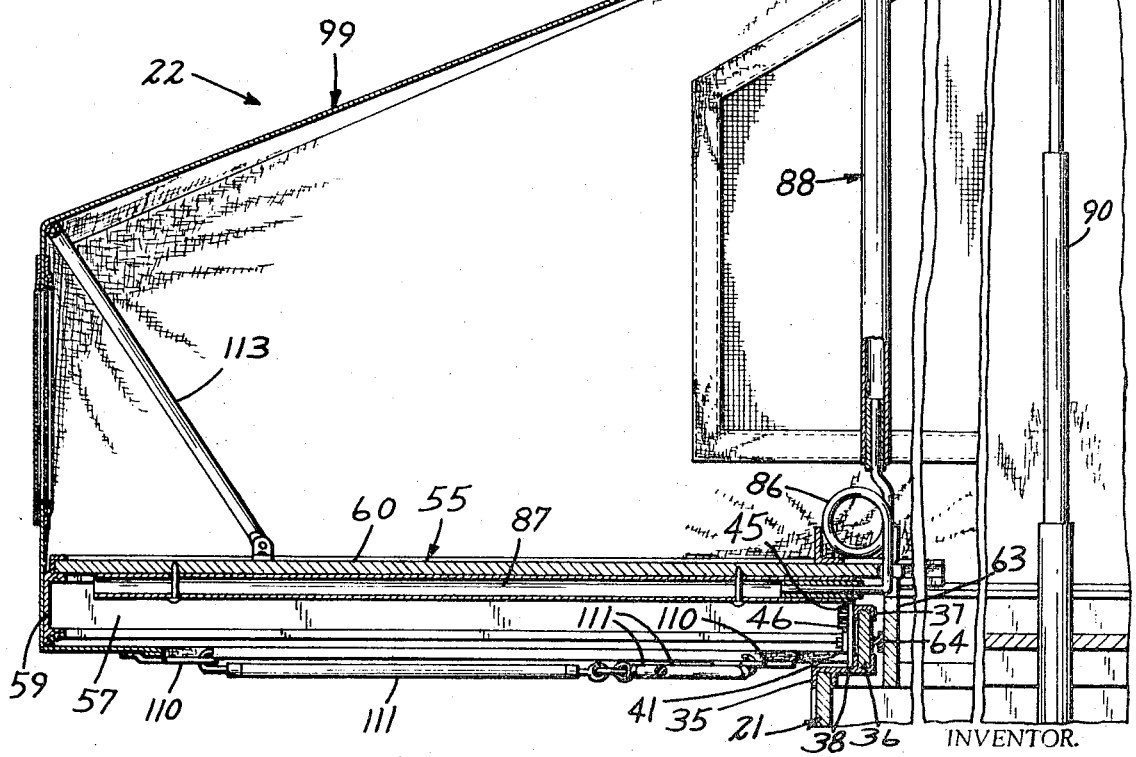

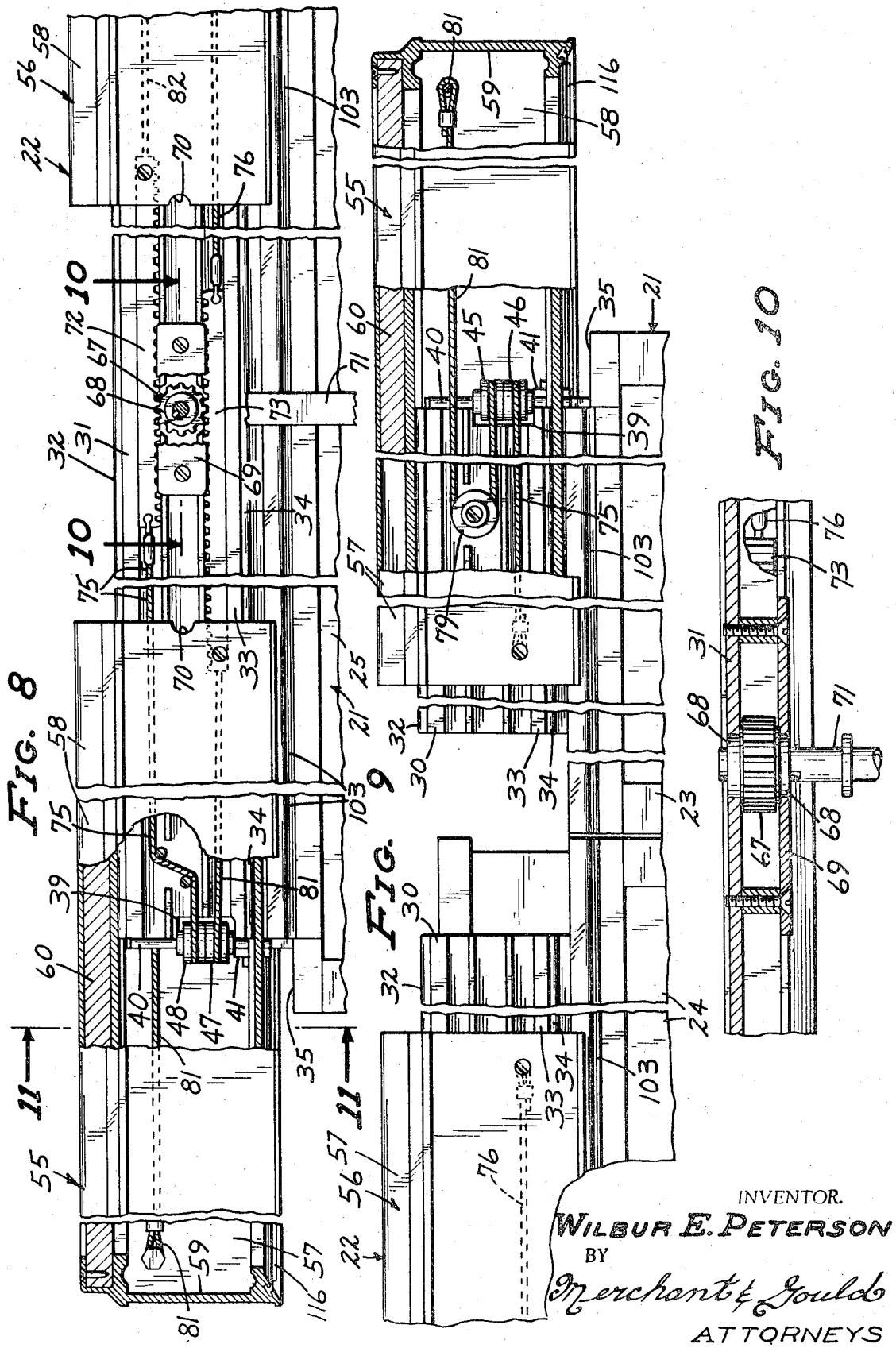

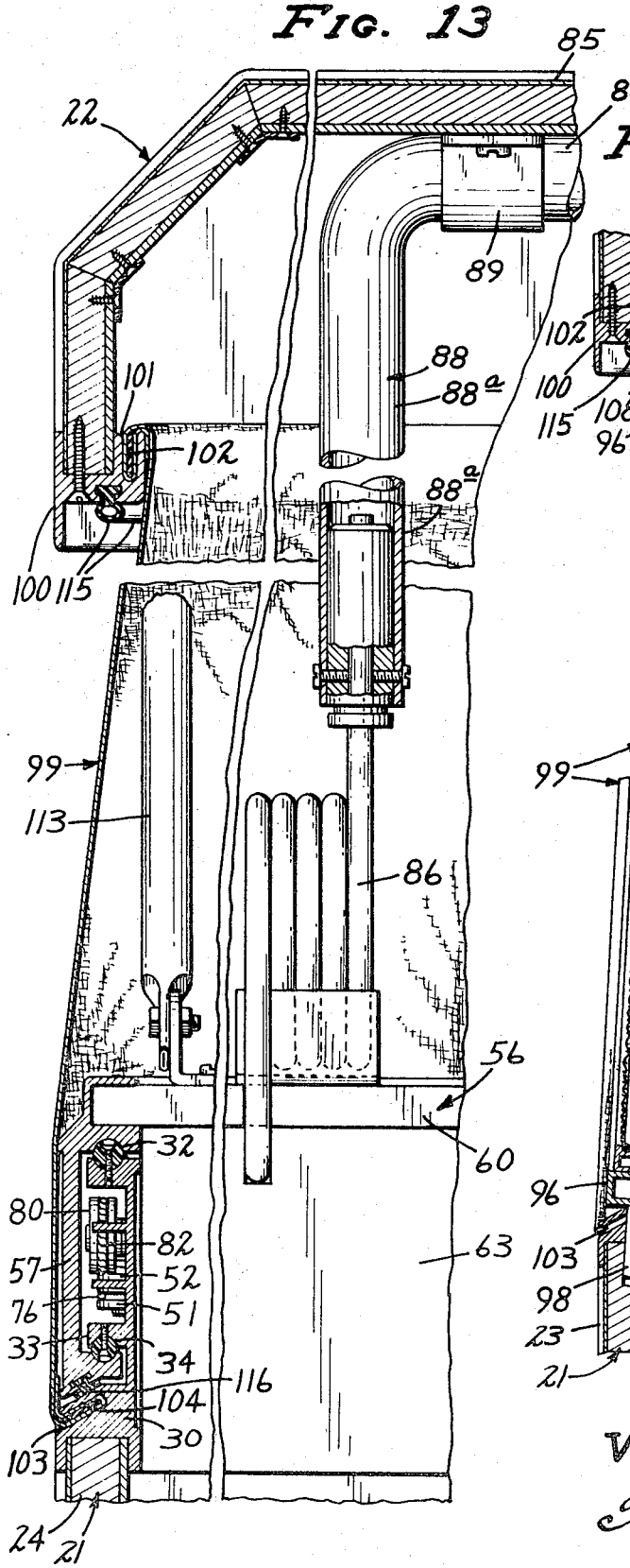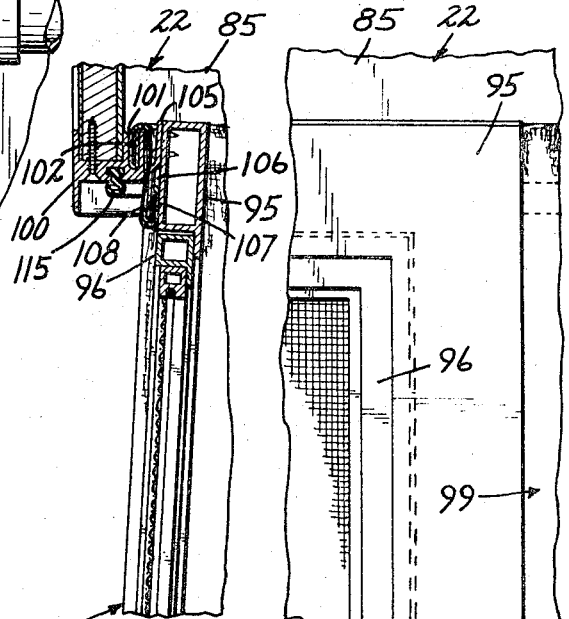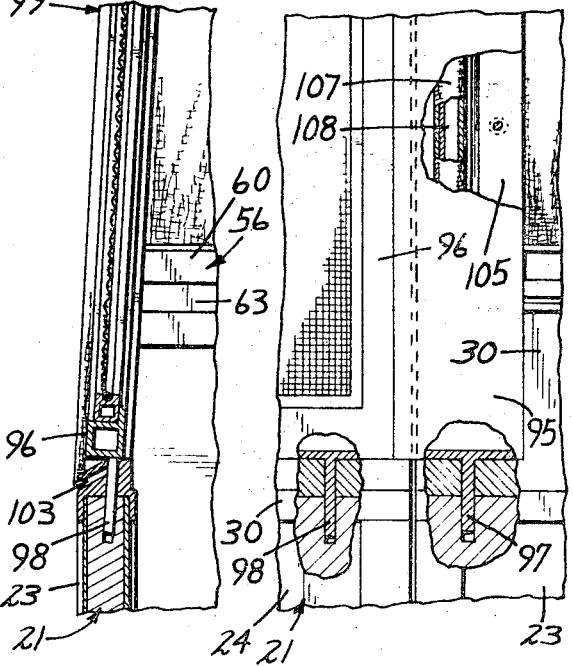

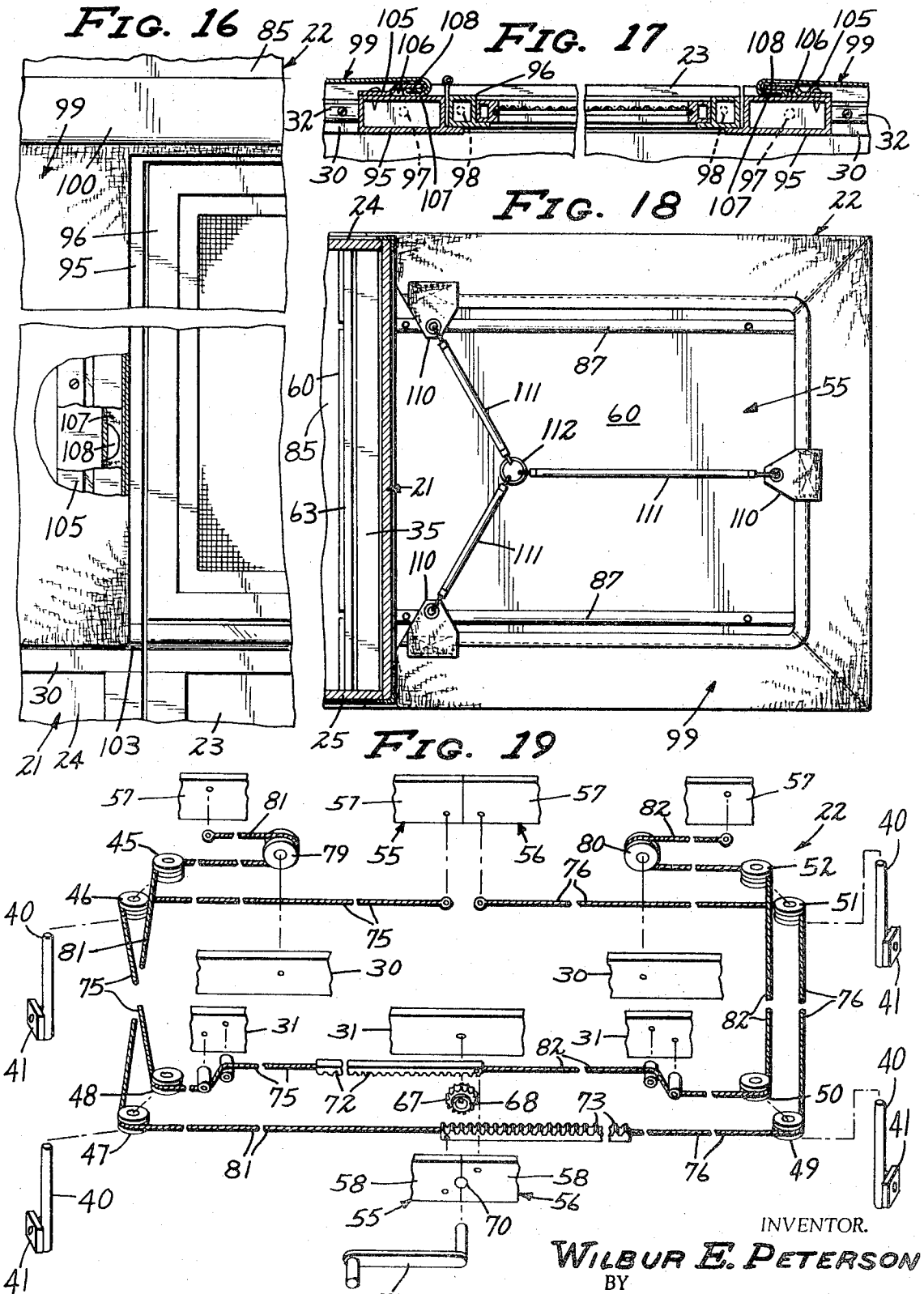

United States Patent Office 3,558,181
Patented Jan. 26, 1971

3,558,181
COLLAPSIBLE TENT TRAILER
Wilbur E. Peterson, Harmony, Minn., assignor to Harmony Enterprises, Inc., Harmony, Minn., a corporation of Minnesota
Filed June 19, 1968, Ser. No. 738,200
Int. Cl. B60p *3/34*
U.S. Cl. 296—27
4 Claims

ABSTRACT OF THE DISCLOSURE

A trailer having a generally box-like body thereon with a pair of wing members slideably engaged at the upper edges for simultaneous sliding movements horizontally outwardly with a roof attached thereto so that outward movement of the wing members causes upward movement of the roof into a serviceable position and inward movement of the wing members causes downward movement of the roof to form a top for the trailer.

BACKGROUND OF THE INVENTION

Field of the invention

In camping and the like tent trailers are presently becoming popular. In general these tent trailers fold into a compact generally box-like trailer during transportation and nonuse. Upon reaching a desirable camp site the device is unfolded to provide a suitable habitation.

Description of the prior art

In the prior art tent trailers are generally comprised entirely of canvas, except for the floor, and are erected in a manner somewhat similar to a tent. Some tent trailers have been constructed with a rigid roof which is placed in position manually and from which the upper edges of the canvas depend. In general these prior art tent trailers are difficult and cumbersome to erect and are little better than a common tent with a convenient place to erect them.

SUMMARY OF THE INVENTION

The present invention pertains to a collapsible tent-type structure having collapsed and serviceable positions and including a generally box-like base, a roof which forms the top of the base in the collapsed position, extendable wing members slideably mounted on the base for limited horizontal movement, and means connected between the wings and the roof for raising the roof to the serviceable position as the wings are moved horizontally outwardly to the serviceable position.

It is an object of the present invention to provide a new and improved collapsible tent-type structure.

It is a further object of the present invention to provide a collapsible tent-type structure having a relatively rigid roof and wing members which are moved into the serviceable position automatically by a single control.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view in side elevation of the present tent trailer in the folded or collapsed position;

FIG. 2 is a view in rear end elevation of the trailer illustrated in FIG. 1;

FIG. 3 is a view in front end elevation of the trailer illustrated in FIG. 1;

FIG. 4 is a view in perspective of the trailer illustrated in FIG. 1 in the serviceable position;

FIG. 5 is a view similar to FIG. 4 with the flexible material removed;

FIG. 6 is an enlarged sectional view as seen from the line 6—6 in FIG. 4;

FIG. 7 is an enlarged sectional view as seen from the line 7—7 in FIG. 2;

FIG. 8 is an enlarged fragmentary view in side elevation of the side of the trailer illustrated in FIG. 1 with the trailer in the serviceable position, parts thereof broken away and shown in section;

FIG. 9 is a view similar to FIG. 8 of the opposite side of the trailer;

FIG. 10 is an enlarged sectional view as seen from the line 10—10 in FIG. 8;

FIG. 11 is a sectional view as seen from the line 11—11 in FIG. 8, portions thereof broken away;

FIG. 12 is a sectional view as seen from the line 12—12, portions thereof broken away;

FIG. 13 is an enlarged sectional view as seen from the line 13—13 in FIG. 4, portions thereof broken away;

FIG. 14 is a sectional view as seen from the line 14—14 in FIG. 4, parts thereof removed;

FIG. 15 is a fragmentary view in side elevation of a portion of the door illustrated in FIG. 14 as seen from right to left, parts thereof broken away and shown in section;

FIG. 16 is a view similar to FIG. 15 illustrating the opposite or outside of the door, parts thereof broken away and shown in section;

FIG. 17 is an enlarged sectional view as seen from the line 17—17 in FIG. 4, parts thereof broken away;

FIG. 18 is an enlarged fragmentary view in bottom plan of one of the wings in the serviceable position; and FIG. 19 is a diagrammatic view of the apparatus for moving the parts of the trailer between the serviceable and collapsed positions.

DESCRIPTION OF THE PREFERRED EMBODIMENTS

In the figures the numeral 20 generally designates a wheeled trailer frame having a trailer bed or box 21 mounted thereon. The trailer frame 20 and box 21 may be any commercially purchased item or, if desired, they may be especially constructed to accommodate the present structure. The present structure is generally designated 22 and is mounted atop the box 21 for movement between a collapsed position, see FIGS. 1 through 3, and a serviceable position, see FIG. 4. The box 21 has a partial door 23 built into one side 24 thereof. The opposite side of the box 21 is designated 25. It should be understood that this embodiment of the present invention is illustrated for exemplary purposes and many modifications and alterations might be devised by those skilled in the art, all of which come within the scope of this invention.

Horizontally extending rails 30 and 31 are affixed to the upper edges of the sides 24 and 25, respectively, of the box 21 so as to extend substantially the length thereof. The rail 30 affixed to the upper edge of the side 24 has a portion at the center thereof cut away to accommodate an extension of the partial door 23, which extension will be described in detail presently. The rails 30 and 31 are substantially similar and a cross sectional view of the rail 30 is illustrated in FIG. 13. In the present embodiment the rails 30 and 31 are extruded and each is formed with a generally flat inner wall and a longitudinally extending groove in the lower edge thereof adapted to receive therein the upper edges of the sides 24 and 25. In addition, the rails 30 and 31 have a groove in the upper edge thereof with an elongated bearing rod 32 fixedly positioned therein by screws or the like. A plurality of longitudinally extending grooves are formed in the outer surface of the rails 30 and 31 and an outwardly extending shoulder 33 between a pair of longitudinally extending grooves has a groove formed in the lower surface thereof with a second bearing rod 34 affixed therein by some means such as screws or the like.

The front are rear ends of the box 21 each have affixed thereto a generally flat member 35 with a pair of downwardly projecting longitudinally extending shoulders thereon adapted to receive therebetween the upper edges of the front and rear ends of the box 21. The flat members 35 are oriented generally horizontal so as to project slightly inwardly from the upper edges and a second pair of upwardly projecting longitudinally extending shoulders are formed adjacent the inner edges of the members 35, which shoulders have engaged therebetween a longitudinally extending board 36. The boards 36 at the front and rear ends of the box 21 each have a channel iron 37 engaged over the upper edges thereof to add strength to the boards 36 and prevent undue wear thereon.

The ends of the rails 30 and 31 and the ends of the assemblies including members 35, boards 36 and channel irons 37, are affixed to upstanding angle irons 38 and each of the corners of the box 21 (see especially FIG. 11). Each of the angle irons 38 is substantially similar and will be designated with similar numerals throughout the drawings for simplicity. Each of the angle irons has a generally centrally located rectangular shaped notch 39 formed at the corners thereof. The angle irons 38 are affixed to the inner or flat surface of the rails 30 and 31 so that the ends of the rails 30 and 31 are spaced a slight distance from the corner of the angle irons 38. The end assemblies, including members 35, boards 36 and channel irons 37, are affixed to the inner surface of the remaining arm of each of the angle irons 38. The ends of the rails 30 and 31 and the boards 36 are notched to coincide with the notches 39 in the angle irons 38.

Four axles 40 having a length approximately equal to the length of the angle irons 38 each have a plate 41 fixedly attached, by some means such as welding or the like, adjacent one end thereof. The plates 41 are bolted to the outer surface of the angle irons 38 so that the axles 40 are approximately vertical and extend across the notches 39 at the ends of the rails 30 and 31. Each of the axles 40 has a pair of pulleys, numbered 45 through 52, rotatably engaged thereon so as to freely rotate about the axles 40 in the notches 39. The pulleys 45 and 46 are mounted on the axle 40 at the front end of the side 24, pulleys 47 and 48 are mounted on the axle 40 at the front end of the side 25, pulleys 49 and 50 are mounted on the axle 40 at the rear end of the side 25, and pulleys 51 and 52 are mounted on the axle 40 at the rear end of the side 24 (see FIG. 19). Each of the pulleys 45 through 52 is freely rotatable individually.

Two wings generally designated 55 and 56 are slideably engaged on the rails 30 and 31 for horizontal movement therealong. The wings 55 and 56 are substantially similar and, therefore, only one wing 55 will be described in detail but it should be understood that similar portions of wing 56 will be designated with similar numerals.

The wing 55 has two sides 57 and 58, a connecting end 59 and a flat floor portion 60 therebetween. Each of the sides 57 and 58 and the connecting end portion 59 are formed from pieces of material having a similar cross section, which in this embodiment is formed by extrusion. The material forming the sides 57–58 and the connecting end 59 has a generally flat outer surface and a longitudinally extending channel is formed in the inner surface with a transverse width slightly greater than the distance between the bearing rods 32 and 34. Longitudinally extending grooves are formed in the horizontal surfaces of the channel and the bearing rods 32 and 34 are received therein (see especially FIGS. 11 and 13) to allow free horizontal movement of the wings 55 and 56. In the present embodiment the bearing rods 32 and 34 are formed from some hard material having a relatively low coefficient of friction, such as plastics sold under the trademark Teflon, or the like, so that the bearing rods 32 and 34 in the rails 30 and 31 can support the weight of the wings 55 and 56 and any additional weight, such as bunks and people, placed thereon. A longitudinally extending groove is provided adjacent the upper edge of the material forming the sides 57–58 and the connecting end 59, which groove receives the edges of the floor portion 60 therein to prevent horizontal movement thereof. The sides 57 and 58 extend inwardly past the inner edge of the floor portion 60 a substantial distance so that there is sufficient material engaged with the rails 30 and 31 to prevent breaking or downward bending of the wings 55 and 56 when they are extended outwardly into the serviceable position.

A board 63 is attached in a downwardly projecting position to the underside of the floor portion 60 along the inner edge thereof between the rails 30 and 31. The board 63 has an elongated resilient seal 64 attached to the surface thereof adjacent the board 36 and in the serviceable position the resilient seal 64 effectively prevents the ingress of foreign material between the box 21 and the floor portion 60 of the wings 55 and 56.

A pinion gear 67 is rotatably mounted to the outer surface of the rail 31 at approximately its longitudinal center by means of axially extending bosses 68 one of which is journaled in the rail 31 and the other of which is journaled and supported by a plate 69 attached to the rail 31 generally parallel thereto but spaced therefrom the width of the pinion gear 67 (see FIG. 10). A hole 70 is provided at the junction of the two sides 58 of the wings 55 and 56 to accommodate the insertion of a crank 71 therethrough. The crank 71 is adapted to engage a central opening in the pinion gear 67 so that the pinion gear 67 can be rotated externally of the box 21. A first gear rack 72 is attached to the side 58 of the wing 56 so as to mesh with the pinion gear 67 and extend longitudinally a substantial distance rearwardly parallel with and into the grooves formed in the rail 31 of the side 25. A second gear rack 73 is attached to the side 58 of the wing 55 so as to be meshed with the pinion gear 67 and extend longitudinally a substantial distance forwardly parallel with and into the grooves formed in the rail 31 of side 25. Referring to FIG. 19 it can be seen that the racks 72 and 73 are positioned so that clockwise movement of the crank 71 and pinion gear 67 moves the rack 72 to the right and the rack 73 to the left, thereby, forcing the sides 58 of the wings 55 and 56 apart.

Referring to FIG. 19 it can be seen that one end of a flexible cable 75 is affixed to the rack 72 and the cable 75 is operatively engaged around the upper pulley 48 at the front corner of the side 24, around the lower pulley 46 at the front corner of the side 25 and the opposite end is fixedly attached adjacent the innermost end of the side 57 of wing 55. In a similar fashion one end of a second flexible cable 76 is fixedly attached to the rack 73, the cable is operatively engaged around the lower pulley 49 at the rear corner of the side 24, around the lower pulley 51 at the rear corner of the side 25, and the opposite end is fixedly attached adjacent the innermost end of the side 57 of the wing 56. Thus, clockwise rotation of the crank 71 produces a force on the cable 75 and 76 tending to pull the sides 57 of the wings 55 and 56 apart so that both of the wings 55 and 56 slide smoothly outwardly into the serviceable position without binding.

A pulley 79 is mounted adjacent the outer surface of the rail 30 for rotation about a horizontal axis between the rail 30 and the side 57 of the wing 55. A second pulley 80 is mounted adjacent the outer surface of the rail 30 for rotation about a horizontal axis between the rail 30 and the side 57 of the wing 56. One end of a first flexible cable 81 is attached to the rack 73 and the cable is operatively engaged around the lower pulley 47 at the front corner of the side 24, the upper pulley 45 at the front corner of the side 25, the pulley 79 with the end extending forwardly toward the front corner of the side 25 where it is attached to the side 57 of the wing 55. In a similar fashion one end of a flexible cable 82 is attached to the rack 72 and the cable is operatively engaged around the upper pulley 50 at the rear corner of the side 24, the upper pulley 52 at the rear corner of the side 25, the pulley 80 and the other end of the cable extends rearwardly toward the rear corner of the side 25 where it is attached to the side 57 of the wing 56. Counterclockwise rotation of the crank 71 moves the racks 72 and 73 in a direction to urge the sides 58 of the wings 55 and 56 toward each other into the collapsed position and, simultaneously, a force is applied to the cables 81 and 82 urging the sides 57 of the wings 55 and 56 towards each other. Thus, counterclockwise rotation of the crank 71 produces smooth horizontal inward movement of the wings 55 and 56 from the serviceable position into the collapsed position.

A relatively rigid roof 85 is formed with a generally flat central portion and downwardly directed edges approximately parallel and overlying the edges of the box 21. Four torsion type coil springs 86 are mounted on the floor portions 60 of the wings 55 and 56 adjacent the inner edges thereof and spaced apart so as to be adjacent the corners of the box 21. The springs 86 are mounted with their axes parallel with the boards 63 and one end of the coil of each spring 86 extends vertically upwardly while the other end is bent so as to extend through a notch in the floor portion 60 and the boards 63 horizontally beneath the floor portion 60. An elongated rod 87 is attached to the end of each of the springs 86 beneath the floor portions 60 and to the underside of the floor portions 60 for providing leverage on the end of the springs 86 to prevent movement thereof. A pair of generally U-shaped rods 88, having two elongated legs 88a joined by a bight 88b, are pivotally affixed to the underside of the roof 85 adjacent the outer edge thereof by bearing clamps 89 engaged over the bight 88b. The legs 88a extend from the underside of the roof 85 and the free ends are engaged with the upwardly extending ends of the springs 86. The bearing clamps 89 are affixed to the underside of the roof 85 adjacent the outer edges thereof so that the legs 88a are approximately perpendicular when the wings 55 and 56 are in the extended or serviceable position. As the wings 55 and 56 are moved inwardly toward the collapsed position of the torsion springs 86 move inwardly toward the center of the box 21 and the legs 88a of the rods 88 are rotated toward a horizontal position, thereby, pulling the roof 85 downwardly (see FIG. 7). The legs 88a are joined by bights 88b to prevent independent movement thereof and insure smooth raising and lowering of the roof 85. Thus, rotation of the crank 71 to move the wings 55 and 56 between the collapsed and serviceable positions also moves the roof 85 between the collapsed and serviceable position. A centrally located telescoping pole 90 is attached between the underside of the roof 85 and the floor of the box 21 (or some object sitting on the floor of the box 21 as illustrated in FIG. 5). As the roof 85 rises the pole 90 telescopes outwardly and adds transverse support thereto. A plurality of over-center latching devices 91 are mounted on the box 21 for engagement with pins 92 on the roof 85 for holding the roof in the collapsed position (see FIGS. 1–3).

To complete the assembly of the tent when the apparatus is moved to the serviceable position, a door frame 95 having a door 96 hingedly mounted therein is manually positioned over the partial door 23 in the box 21. Downwardly extending vertical pins 97 maintain the frame 95 fixedly positioned in place and downwardly extending vertical pins 98 engage the door 96 and the partial door 23 together so that movement of one causes movement of the other.

Once the frame 95 is manually positioned the entire apparatus is enclosed with a continuous piece 99 of flexible material, such as canvas or the like. A molded piece of material 100 having an upwardly opening groove 101 therein is affixed to the lower edges of the roof 85 so that the groove 101 is adjacent the inner surface of the downwardly extending edges of the roof 85. The upper edges of the continuous piece 99 are affixed in the groove 101 by means of resilient material 102 which is sewn into a hem along the upper edges of the continuous piece 99. The resilient material 102 is forced into the upwardly opening groove 101 and holds the continuous piece 99 fixedly engaged with the roof 85.

A downwardly and outwardly opening groove 103 is formed in the rails 30 and 31 below the sides 57 and 58 of the wings 55 and 56. The lower edges of the continuous piece 99 have a hem formed therein with resilient material 104 contained in the hem. The resilient material 104 is forced into the grooves 103 to hold the lower edges of the continuous piece 99 fixedly engaged with the rails 30 and 31. An elongated bracket 105 is affixed to the frame 95 around the door 96 to form a generally horizontal groove 106 which opens inwardly toward the door 96 and receives a hem 107 with resilient material 108 therein. The hem 107 in the continuous piece 99 extends around the sides and top of the door 96 and maintains the continuous piece 99 fixedly engaged with the frame 95. The lower edges of the continuous piece 99 adjacent the wings 55 and 56 extend below the wings 55 and 56 and have tabs 110 fixedly attached thereto (see FIG. 18). The tabs 110 each have an eye therein to facilitate hooking the ends of a plurality of flexible cables 111 thereto. The free ends of the flexible cables 111 are attached to a centrally located ring 112 to maintain a force on the tabs 110 pulling them inwardly beneath the wings 55 and 56 and maintaining the continuous piece 99 taut. Thus, all of the edges of the continuous piece 99 are affixed to the apparatus to maintain the continuous piece 99 taut and prevent the ingress of foreign material.

A pair of U-shaped rods 113 each have both ends pivotally attached to the floor portion 60 of the wings 55 and 56 adjacent and approximately parallel the connecting ends 59 thereof. The rods 113 lie flat on the floor portion 60 in the collapsed position and are pivoted manually upwardly in the serviceable position to hold the continuous piece 99 away from the wings 55 and 56 to form rooms therewith. Resilient seals 115 are provided along the entire lower edge of the piece of material attached to the lower edge of the roof 85 so that a seal is provided between the piece of material 100 and the upper edges of the wings 55 and 56 in the collapsed position to prevent the ingress of foreign material. Resilient seals 116 are also affixed in the lower edges of the sides 57 and 58 to provide a seal between the sides 57 and 58 of the wings 55 and 56 and the rails 30 and 31 so that no foreign material can enter therebetween in the collapsed position. Thus, the entire structure is sealed against the ingress of foreign material in either the collapsed or serviceable position.

A collapsible tent-type structure is disclosed which can be assembled on substantially any type of trailer to provide a suitable habitat for camping and the like. Further, the structure is quickly and easily convertible from the collapsed to the serviceable position and back to the collapsed position after the use thereof.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. A collapsible tent-type structure having collapsed and service positions comprising:
(a) a plurality of elongated rails constructed for mounting in a generally horizontal orientation on a box-like base;
(b) extendable wing members having downwardly extending, horizontally oriented portions mating with said rails and engaged therewith for allowing limited relative horizontal movement between said rails and said wing members while substantially preventing relative vertical movements;
(c) a roof forming a top for the base and said wing members and having a plurality of elongated rods pivotally affixed thereto;
(d) means affixing said elongated rods to said wing members for moving said roof into an elevated service position upon movement of said wing members into an outwardly extending position upon movement of said wing members inwardly into a collapsed position; and
(e) a manually operable drive member rotatably mounted on said base and moveably engaged with driven members affixed to each of said wing members for substantially simultaneously moving said wing members between the collapsed and extended positions.

2. The collapsible tent-like structure as set forth in claim 1 having in addition flexible material engageable between the roof, the wing members and the base to form a generally rain and weather-tight enclosure.

3. A collapsible tent-type structure as set forth in claim 1 having in addition a plurality of elongated bearing surfaces affixed between the elongated rails and the mating portions of the wing members for providing horizontal sliding movements therebetween.

4. A collapsible tent-type structure as set forth in claim 1 wherein the means affixing said elongated rods to said wing members include a plurality of coil springs each having two ends normally extending outwardly perpendicular to each other, one end of each of said springs being fixedly engaged, generally axially in one of said elongated rods and the other end of each of said springs having a second elongated rod axially engaged thereon with the second elongated rods being fixedly engaged to one of said wing members generally parallel with said rails.

References Cited
UNITED STATES PATENTS

| | | | |
|---|---|---|---|
| 3,466,082 | 9/1969 | Branch | 296—23 |
| 3,429,608 | 2/1969 | Farnum | 296—27X |
| 3,456,978 | 7/1969 | Daniels | 296—23 |
| 3,397,007 | 8/1968 | Scheid | 296—27 |
| 2,055,930 | 9/1936 | Josephs | 296—23(.3) |

PHILIP GOODMAN, Primary Examiner

U.S. Cl. X.R.

52—66